March 12, 1963 J. G. VAN SANTEN 3,081,402

SOLID-STATE IMAGE INTENSIFIER

Filed Feb. 16, 1960 2 Sheets-Sheet 1

INVENTOR

JOHANNES G. VAN SANTEN

BY

Frank R. Trifari

AGENT

INVENTOR
JOHANNES G. VAN SANTEN.
BY
Frank R. Jifani
AGENT

United States Patent Office 3,081,402
Patented Mar. 12, 1963

3,081,402
SOLID-STATE IMAGE INTENSIFIER

Johannes Gerrit Van Santen, Eindhoven, Netherlands, assignor to North American Philips Company, Inc., New York, N.Y., a corporation of Delaware Filed Feb. 16, 1960, Ser. No. 9,048
Claims priority, application Netherlands Feb. 20, 1959
9 Claims. (Cl. 250—213)

The invention relates to a solid-state image intensifier provided with electrodes for applying an alternating supply voltage and comprising electric-field-sensitive luminescent elements and radiation-sensitive impedance-variable elements, the part of the supply voltage appearing across any luminescent element being controlled by at least two radiation-sensitive elements electrically associated with said luminescent element.

It is known to increase the sensitivity of a solid-state image intensifier by biasing the photo-conductive elements by a constant direct voltage. Such a bias voltage can be obtained by connecting two photo-conductive elements associated with the same luminescent element to a direct voltage source, of which the electric center is connected to one output terminal of an alternating voltage source, and of which the other ouput terminal is connected to the electrode of the luminescent element. It is also known to connect each of two photo-conductive elements via a rectifier to the same ouput terminal of the alternating voltage source, these rectifiers having opposite blocking directions, viewed from the said output terminal.

The invention has for its object to provide a solid-state image intensifier of the kind set forth, which also has an increased sensitivity, which requires, however, no other external expedients than the alternating voltage source.

It has been found that a photo-conductive element consisting of a finely divided photo-conductive material and an electret material as a binder can be brought into an asymmetric state of conductivity for alternating current of not too low a frequency by electric polarization of the electret material. The direction in which the current is then passed with the highest intensity is opposite the direction of the electric field produced by the polarization.

The invention is based on the recognition of the fact that the object aimed at can be attained by using such polarised, photo-conductive elements in a solid-state image intensifier with a correct choice of the polarization direction of these elements.

In accordance with the invention, the photo-conductive elements, consisting of a finely divided, photo-conductive material and a glass-enamel type electret material as a binder, are in an asymmetric conductivity state for alternating current by electric polarization of the electret material and a group of photo-conductive elements associated with the same luminescent element comprises elements which viewed from the said luminescent element exhibit opposite polarization.

If in a solid-state image intensifier according to the invention one luminescent element has associated with it more than two photo-conductive elements, the number of these photo-conductive elements polarized in the one direction is preferably as far as possible equal to the number of elements polarized in the other direction.

The electret material of the photo-conductive elements consists preferably of a lithium-containing glass enamel, constituting 10 to 30% by volume of the material of the photo-conductive elements. The photo-conductive material of the photo-conductive elements consists preferably of a chalcogenide of cadmium, particularly cadmium sulphide, activated by $2\times10^{-4}$ g.at. of copper and $1.9\times10^{-4}$ g.at. of gallium per gram mol of cadmium sulphide. Chalcogenides of cadmium are to be understood to mean herein the compounds of cadmium with sulphur, selenium and tellurium but not with polonium.

The invention will now be described more fully with reference to a few embodiments shown diagrammatically in the accompanying drawing, in which.

Figure 1:
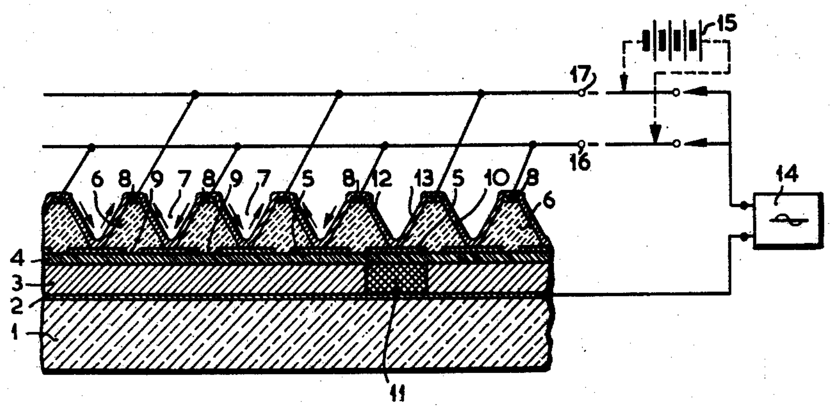
FIG. 1 is a diagrammatical, sectional view of part of a first embodiment.

The solid-state image intensifier illustrated in FIG. 1 comprises a glass plate 1, coated with a transparent conductive layer 2, constituting one of the electrodes of the image intensifier. This layer may consist, for example, of metal or conductive tin oxide applied by evaporation. To the electrode 2 is applied an electro-luminescent layer 3 of 50 to 100$\mu$ in thickness. The layer 3 contains 20% by volume of copper- and aluminum-activated zinc sulphide and 80% by volume of lead-free glass enamel.

The electro-luminescent layer 3 is covered by an opaque layer 4 of a few microns thickness, made of light-reflecting material such as titanium dioxide or magnesium oxide or of a material of high light absorption for example black glass. To this intermediate layer 4 are applied a plurality of separated auxiliary electrode elements 5, of which the dimension at right angles to the plane of the drawing does not exceed that in the plane of the drawing.

These auxiliary electrode elements 5, which constitute so to say islands and which consist of metal, for example, aluminum, applied by evaporation or by other means, may have a thickness of a few microns. The width of the intermediate spaces 9 between successive auxiliary electrode elements is about 200$\mu$. The auxiliary electrode elements 5 are arranged one behind the other in rows extending in a direction transverse to the plane of the drawing. To the layer 4 with the auxiliary electrode elements 5 are applied a plurality of insulating, equidistant ridges 6 of sintered glass powder, which also extend transversely to the plane of the drawing and between which grooves 7 are provided. These grooves extend each in the center of a row of auxiliary electrode elements down to the said elements. The ridges 6 taper towards the apex, so that the walls of a groove 7 are at an angle of about 60°, the ridges having a height of about 0.5 mm. and a relative center distance of about 0.8 mm. The flat crests of the ridges 6 have a width of about 200$\mu$ and are provided each with a line-like electrode 8 extending transversely to the plane of the drawing.

The ridges 6 with the electrodes 8 applied thereto, and the parts of the auxiliary electrode elements 5 located between the ridges and the opaque layer 4, are covered by a photo-conductive layer 10 of uniform thickness (of 70 to 80$\mu$). This layer consists of 90 to 70% by volume, preferably of 80% by volume of finely divided, photo-conductive cadmium sulphide or cadmium selenide and of 10 to 30% by volume of electret material, which constitutes at the same time a binder. The electret material is preferably a lead-free, lithium-containing glass enamel.

A suitable composition (in mol percent) of such an enamel is, for example: $Li_2O$ 15%; $K_2O$ 7.5%; CaO 10.5%; SrO 4.5%; ZnO 10.3%; $TiO_2$ 10.8%; $Al_2O_3$ 2.3%; $SiO_2$ 18.8%; $B_2O_3$ 28.3%.

Although a glass-enamel of the above composition appears to be one of the most suitable to be used in the solid-state image intensifier according to the invention, this should not be interpreted as restricting the invention to the use of that particular glass-enamel. Glass-enamels of somewhat different composition may also be used. For instance, good results were obtained with glass-enamels differing from the above in the $LiO_2$ and $K_2O$ contents only, such as an enamel comprising 11.25 mol percent $Na_2O$ and 11.25 mol percent $K_2O$ or 22.5 mol percent $Na_2O$ and no $K_2O$.

In a solid-state image intensifier of the structure set forth each portion of the layer 3 forming an electro-luminescent element and located directly below an auxiliary electrode element 5 has electrically associated with it two photo-conductive elements. These photo-sensitive elements are formed by those portions of the layer 10 which extend from the auxiliary electrode element 5 concerned towards the adjacent electrodes 8. For instance, with the electro-luminescent element designated by 11 in FIG. 1 are associated the photo-conductive elements 12 and 13.

The photo-conductive elements associated with the same electro-luminescent element are electrically polarized in such way that they have opposite polarization direction, when viewed from the said electro-luminescent element. This means that, viewed from the bottom of a groove 7, the polarization direction of that portion of the layer 10 which is located on one side wall of a groove, is opposite to that of the portion of the layer 10 located on the other side wall of said groove.

Moreover, the polarization direction is chosen so that, viewed from a line-like electrode 8, the two portions of the layer 10 on either side of the ridge 6, on which that electrode 8 is provided, have the same polarization direction. For clarity the polarization direction of different portions of the layer 10 is indicated by arrows.

In order to make the intensifier described above operable, an alternating voltage source 14 is connected on the one hand to the electrode 2 and on the other hand to the electrodes 8 electrically tied together. The opposite polarization directions of the photo-conductive elements associated with a same electro-luminescent element render the image intensifier more sensitive than would be the case without this polarization.

In the manufacture of the image intensifier described the photo-conductive layer 10 may be obtained by spreading over the ridges 6 a thin layer of a suspension of photo-conductive grains and powdered glass enamel in an organic liquid, for example, butylacetate, and subsequently heating this layer to about 600° C. for about 3 minutes. The photo-conductive layer obtained after cooling is not polarized. The desired polarization may then be acquired by applying a suitable direct voltage between successive electrodes 8 with the aid of a direct-voltage source 15 and by simultaneously rendering the layer more or less conductive by exposure, while at the same time the temperature of this layer is raised to about 120° C. This rise in temperature may be obtained, according to circumstances, by dissipation of electric energy in the layer, when a sufficiently high direct voltage is applied to the electrodes 8 and the exposure intensity is sufficient for the layer 10 to become satisfactorily conductive. As a matter of course, the break-down voltage must not be exceeded; for this reason the layer is preferably raised to the desired temperature by external supply of heat, for instance simply by heating in air. The polarization of the layer 10 of the afore-said image intensifier can in the latter case be obtained by a direct voltage of about 650 v. and a simultaneous exposure to white light (luminous intensity about 20 lux), the duration of the treatment being 5 to 10 sec. Under normal conditions the polarization subsists for weeks without appreciable drop; it is found that spontaneous depolarization does practically not occur. If, after a fairly long time, the polarization of the photo-conductive layer 10 should diminish, it can be restored in the manner described above. With a view thereto it is advantageous, in the manufacture of the image intensifier, to provide a permanent electric connection only between every other electrode 8, while only when the image intensifier is prepared for use or held ready for operation the two groups of electrode elements thus formed are electrically interconnected by a connection which can be interrupted for the polarization of the photo-conductive layer 10. This may be realized, for example, by grouping the electrodes 8 in the form of two comb-shaped sets with interleaved tines, while the interconnection of the tines of one comb is located at one end of the ridges 6 and the interconnection of the tines of the other comb at the other end thereof. These interconnections may consist of the same material and be shaped in the same form as the separate electrodes 8 on the ridges 6. Each of the combs has a connecting terminal, designated in FIG. 1 by 16 and 17, at the side of the intensifier; for the polarization the direct-current source 15 is connected between these terminals; in normal operation of the intensifier these terminals are together connected to one terminal of the alternating supply voltage source 14.

Figure 2:
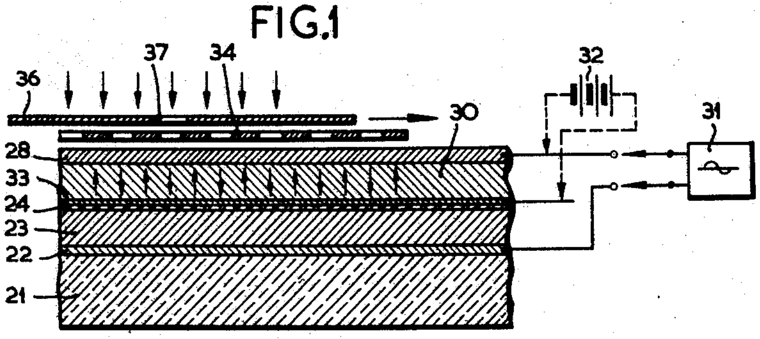
FIG. 2 shows, also in cross-sectional view, part of a second embodiment.

In the solid-state image intensifier shown in FIG. 2 an electro-luminescent layer 23, covered by a light-absorbing or light-reflecting layer 24, is applied to a flat electrode 22, which is arranged on a glass plate 21. So far the structure of the intensifier shown in FIG. 2 is identical to that of FIG. 1.

On the coating 24 is provided a thin intermediate layer 33, of more or less conductive material, for example, graphite, metal or tin oxide, which is sufficiently thin to provide a fairly high electric resistance per square cm. To this layer 33 are applied the photo-conductive elements of the image intensifier in the form of a flat layer 30 of about 100 to 300$\mu$ in thickness, the image intensifier being thus very suitable for working X-rays or other hard rays. The composition of the layer 30 corresponds with that of the layer 10 of the embodiment shown in FIG. 1.

On the photo-conductive layer 30 is provided the second electrode of the image intensifier, formed by a transparent, conductive layer 28, which may consist of a metal or a conductive oxide.

Figure 3:
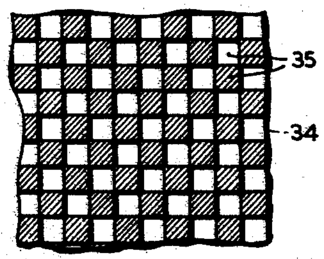
FIG. 3 shows part of a mask to be used in obtaining the desired polarisation of the photo-conductive elements of the intensifier shown in FIG. 2.

The photo-conductive layer 30 has a large number of elementary domains of alternately opposite polarization in the direction of thickness of the layer, so that, viewed from the electro-luminescent layer 23, they have opposite pass or conductive directions. During the operation of the solid-state image intensifier, when the electrodes 22 and 28 are connected to the output terminals of an alternating-voltage source 31, the structure described ensures that an element of the electro-luminescent layer 23 is fed via elements of opposite polarization in the photo-conductive layer 30. It will be obvious that the electric resistance of the layer 33, measured in its plane, must not be excessively low in order to avoid blurring of the image contours owing to stray current in this intermediate layer. The layer 33 is, however, required to permit of polarizing the photo-conductive layer 30 so that domains are formed of alternately opposite polarization direction. Such a polarization may be carried out as follows: on the electrode 28 is arranged a mask 34, having a great number of alternately transparent and opaque areas 35, for example, according to a chess-board pattern. FIG. 3 shows, on a greatly enlarged scale, part of such a mask, which may be formed, for instance, by a photographic transparency. The square dimensions of the areas 35 may be of the order of about 200$\mu$. The photo-conductive layer 30, heated to a temperature of about 120° C., is then exposed through this mask to white light (luminous intensity 10 to 20 lux) and at the same time the electrode 28 and the intermediate layer 33 are connected to a direct-voltage source 32 of 300 to 400 v. Under these conditions the voltage between the electrode 28 and the intermediate layer 33 is maintained for 10 to 15 sec. and those elements of the photo-conductive layer 30 which are located below the transparent areas of the mask 34 are polarized. The polarization current may produce in the layer 33 such a voltage drop that the photo-conductive layer 30 is inadequately polarized, particularly those parts which are farthest removed from the edge of the intermediate layer 33, accessible for the connection to the voltage source 32. In this case it is desirable not to polarize simultaneously all elements of the layer 30 lying below the transparent areas of the mask 34. This may be obtained by projecting the light, each time, only through a certain number of the transparent areas of the mask 34 onto the photo-conductive layer 30. This may be carried out, for example, by arranging, over the stationary mask 34, a second mask 36, which is provided with a single slot or transparent portion 37, this second mask being moved above the mask 34 in a direction transverse to the longitudinal direction of the slot 37. The speed of the movement is chosen so that each portion of the mask is exposed for 10 to 15 sec.

After this polarization of the elements of the photo-conductive layer 30, located below the transparent areas of the mask 34, this mask is displaced so that the polarized elements of the photo-conductive layer arrive below the opaque areas and the elements of the photo-conductive layer not yet polarized, i.e. not yet exposed, below the transparent areas of the mask 34. In this position of the mask 34 again a polarizing treatment as described above is carried out, the connections of the electrode 28 and the intermediate layer 33 to the voltage source 32, however, now being reversed. Thus the elements of the photo-conductive layer 30 not polarized during the first treatment are polarized in a direction opposite the polarization direction of the elements polarized during the first treatment.

Figure 4:
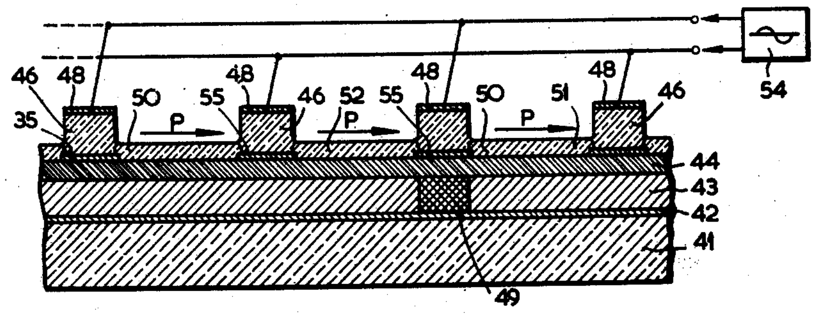
FIG. 4 shows part of a sectional view of a solid-state image intensifier according to the invention, in which, contrary to the embodiments shown in FIGS. 1 and 2, the photoconductive elements are electrically connected in parallel with the electro-luminescent elements.
Figure 5:
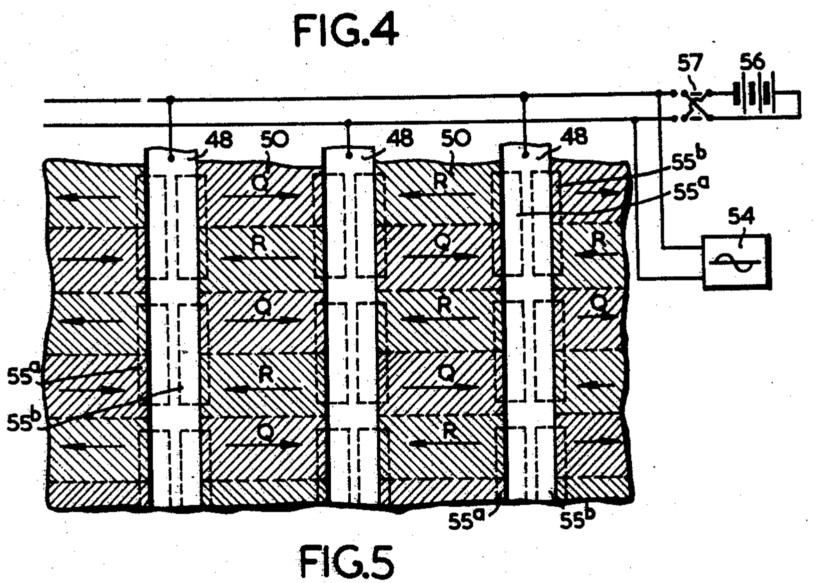
FIG. 5 is a plan view of part of a solid-state image intensifier, the structure of which corresponds with that of FIG. 4, however with a different relative position of the photo-conductive elements of opposite polarization

In contradistinction to the embodiments described in the foregoing, the photo-conductive elements of the embodiments shown in FIGS. 4 and 5 are electrically connected in parallel with the electro-luminescent elements.

The image intensifier shown in FIG. 4 comprises a transparent supporting plate 41, on which are provided a plane, transparent electrode 42 and an electro-luminescent layer 43, which are covered by an opaque intermediate layer, if necessary together with a light-reflecting layer. This layer is designated by 44. So far the structure and the composition are identical to those of the embodiments described above.

At equal distances of about 1500 to 2400$\mu$ the intermediate layer is provided with rows of separated auxiliary electrode elements 55, said rows extending transversely to the plane of the drawing. These electrode elements may be formed by metal plates of a thickness of a few microns. These auxiliary electrode elements have a dimension in the direction transverse to the plane of the drawing which does not exceed the center to center distance of adjacent rows.

The edges of auxiliary electrode elements facing each other in adjacent rows and the gap between these rows are bridged by photo-conductive paths 50, which thus extend in the longitudinal direction of the said rows. The paths 50, which have a thickness of 50 to 30$\mu$, consist of a photo-conductive material such as activated cadmium sulphide in an electret material as a binder. The composition may, for example, be equal to that of the photo-conductive layers 10 and 30 of the embodiments shown in FIGS. 1 and 2. The uncovered parts of the auxiliary electrode elements 55 and, if necessary, also the edges of the adjacent photo-conductive strips 50 are covered by strips 46 of insulating or resistance material, which are provided each on top with a line-like electrode 48. The strips 46 may consist, for example, of ethoxyline- or polyester-resin. Polytetra-fluoroethylene is also a suitable material for the strips 46. The photo-conductive paths 50 are all polarized in the same direction P, which is transverse to their longitudinal direction and parallel to the intermediate layer 44.

In order to make the image intensifier ready for use the electrodes 48 are alternately electrically interconnected, if this has not yet been done, and the two groups of electrode elements thus formed are connected to the two output terminals of an alternating-voltage source 54. The electrode 42 need not be connected to the said source. This plane electrode is intended to direct the electric field in the electro-luminescent layer 43 as far as possible transversely to the plane of the said layer. The alternating voltage applied to two successive electrodes 48 produces a partial alternating voltage between the auxiliary electrode elements 55 of one row and those of the adjacent row, of which partial voltage the amplitude varies with the conductivity of the portions of the photo-conductive path 50 bridging the auxiliary electrode elements concerned. An increased local conductivity of a path owing to a local exposure provides a lower partial alternating voltage. This partial alternating voltage produces, below the auxiliary electrode elements 55, a proportional electric field intensity in the electro-luminescent layer 43. The field intensity in an electro-luminescent element below a given auxiliary electrode element 55 depends, consequently, on the exposure of those portions of the adjacent photo-conductive paths 50, which overlap the edges of the auxiliary electrode element concerned, i.e. two photo-conductive elements which are located each in a different photo-conductive path on either side of the auxiliary electrode element concerned. For example, the electric field strength in the electro-luminescent element designated by 49 in FIG. 4 is controlled by the photo-conductive elements 51 and 52. Since the photo-conductive paths 50 are polarized in the same direction P, the photo-conductive elements associated with a same electro-luminescent element are polarized in opposite directions, viewed from the electro-luminescent element concerned.

Figure 6:
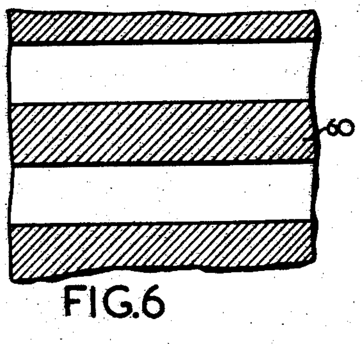
FIG. 6 shows part of a mask to be used in polarizing the intensifier shown in FIG. 5.

The embodiment of which FIG. 5 is part of a plan view differs from that shown in FIG. 4 in that each auxiliary electrode element consists of two closely neighbouring, separated plates 55*a* and 55*b* and that successive parts of each of the photo-conductive paths 50 are polarized in opposite directions. The polarisation in one direction is indicated by an arrow Q, that in the other direction by an arrow R. The domains of opposite polarisations are chosen so that each time, two domains with opposite polarisation directions terminate at the edge of each of the auxiliary electrode plates 55*a* and 55*b*. The electric field intensity in an electro-luminescent element, i.e. a domain of the layer 43 below an auxiliary electrode plate 55*a* and the auxiliary electrode plate 55*b*, connected herewith by part of a photo-conductive path 50, is controlled by the said part of the photo-conductive path 50 concerned. Consequently, this part comprises two photo-conductive elements polarized in opposite directions. The polarisation described of the photo-conductive parts of the image intensifier shown in FIGS. 4 and 5, can be obtained as in the foregoing embodiments by applying a suitable direct voltage to the photo-conductive parts concerned, while simultaneously the resistance thereof is reduced by exposure and these elements are brought to a temperature of, for example, 110° C. If the paths 46, of which the elements constitute a series impedance for the parallel-combination of the photo-conductive and electro-luminescent elements, consist of insulating material and are therefore mainly operative in a capacitative manner, it is practically not feasible to obtain the electric field intensity required for the polarisation in the photo-conductive elements by applying a direct voltage between successive electrodes 48. In this case the polarisation of the photo-conductive elements must be carried out during the manufacture of the image intensifier, i.e. before the paths 46 with the electrodes 48 are arranged over the electrode-elements 55. In order to apply the polarizing direct voltage, the image intensifier is contacted by a support having parallel extending line-shaped electrodes in such manner that each of these linear electrodes extends over and electrically contacts a series of auxiliary electrode elements 55 or 55*a* and 55*b*. These line-shaped electrodes are alternately connected electrically and the two groups of electrodes thus formed are connected to different poles of a direct voltage source. All photo-conductive paths 50 are polarized in the same transverse direction (embodiment shown in FIG. 4) by, for example, first exposing the odd-numbered paths, while the even-numbered paths are covered by a mask. After the polarisation of the odd-numbered paths, the direct connections of the voltage source is connected inversely to the two groups of electrode lines and then the even-numbered paths are exposed, so that the already polarized odd-numbered paths are covered by the mask. For polarizing the photo-conductive elements of the embodiment shown in FIG. 5 a mask 60 is used, which comprises alternately transparent and opaque strips as is illustrated in FIG. 6. The width of these strips is substantially equal to half the length of the auxiliary electrode plates 55*a* and 55*b*. By means of this mask, first a first set of photo-conductive elements located in rows transverse to the photo-conductive paths are exposed, whereas the other elements of the photo-conductive paths are covered by the opaque strips of the mask. After the polarization of the exposed elements, the mask is displaced over the width of a strip thereof, so that now the other elements of the photo-conductive paths can be exposed and polarized, whereas the elements already polarized are covered. During the last-mentioned polarizing process the direct voltage source is connected inversely to the electrodes on the support contacting the auxiliary electrode elements 55*a* and *b*.

The aforesaid method has the disadvantage that in an image intensifier ready for use it is difficult or even practically impossible to restore the polarisation of the photo-conductive elements if such polarisation has decreased with time. Since the paths 46 are insulated, the auxiliary electrode elements 55, 55*a* and 55*b* are no longer accessible to the polarizing voltage. For this reason it is to be preferred to construct the paths 46 so that they are more or less conductive or can be rendered conductive. The former may be obtained by using, as a material for the paths 46, a conductive material, for example, conductive cadmium sulphide or graphite in an insulating binder, for example, a cellulose lacquer or the aforesaid ethoxyline resin or polyester resin. The conductivity of the paths 46 should, however, be low in the longitudinal direction of the paths. It is therefore to be preferred to use for the paths 46 a material which, in the normal operation of the image intensifier, has a high resistivity, which resistivity can be temporarily reduced, however, by special means. This may be achieved by using, for the paths 46, a resistance material which has a high resistance at room temperature and which exhibits a high negative temperature coefficient of the resistivity. At the increased temperature of about 120° C. required for polarisation the resistance of the paths 46 can thus be sufficiently reduced during polarisation to produce an adequate electric field intensity in the photo-conductive elements by means of a reasonable direct voltage between the successive electrodes 48. For such purpose oxidic materials may be used for the paths 46, for example materials on the basis of ferrites or of iron oxide with an addition of titanium oxide or on the basis of nickel oxide with an addition of lithium oxide. If necessary a small supply of water glass may be employed as a binder. However, the desired reduction of the electric resistance of the paths 46 in order to be able to apply a polarising voltage to the photo-conductive paths is preferably obtained by including in these paths 46 a photo-conductive material, and to expose these paths during polarisation to a suitable radiation which increases their conductivity. As a matter of fact, the nature of the paths 46 must be such that, during normal operation of the image intensifier, their resistance is little or not affected by the radiation of the image which the intensifier has to amplify or make visible. This may be achieved by providing the paths 46 with a screening material protecting them from the primary radiation image, if, at least, this is formed by a radiation in the visible spectrum and/or adjacent spectral regions. This screening of the paths 46 can for example, be done by covering them with black lacquer. The screening of the paths 46 may for a large part be obtained by providing such thick electrodes 48 that these electrodes are opaque to visible light. The desired conductivity of the paths 46 during the polarisation of the photo-conductive elements 50 may then be obtained by means of a radiation penetrating the screening material, for example, X-rays. In a different embodiment of the paths 46, these paths comprise a photo-conductive material, for example, of a similar kind as that employed in the photo-conductive path 50, the sensitivity of the material being, however, considerably lower than that of the material in the paths 50. In the normal use of the image intensifier only a low photo-conductivity is produced in the paths 46, while in effecting the desired polarisation of the photo-conductive paths 50 the paths 46 are exposed to light of such a high intensity that their resistance is considerably decreased.

The low sensitivity of the photo-conductive material to be incorporated in the paths 46 may be obtained, for example, by using cadmium sulphide which is only lightly activated or in which no co-activator is used. During polarization the paths 46 must be exposed to high intensity, whereas one series or the other series of elements of the photo-conductive paths 50 must be exposed to a lower intensity. This may be realized by means of a strong light source and a mask which is completely transparent at the place of the paths 46, completely opaque at the place of one series of elements of the paths 50 and is pervious only to part of the incident light at the place of the other series of elements. The latter elements can then be polarized. With an image intensifier in which it is possible to reduce the resistance of the paths 46 temporarily, i.e. during polarization, the direct voltage source 56 (FIG. 5) used for palarization is connected, for example, via a commutator 57, to the electrodes 48, to which, united in two groups, are connected the alternating voltage source 54 in the normal operation of the image intensifier. It is thus always possible to restore a decreased polarization of the photoconductive elements 50.

What is claimed is:

1. A solid state image intensifier comprising plural electric-field-responsive luminescent elements and plural radiation-responsive variable-impedance elements, means for applying an energizing alternating voltage to the said elements, and means interconnecting the said elements at which the successive voltages applied to each luminescent element are alternately determined by the impedance condition of one of two variable-impedance elements, said variable-impedance elements each being constituted by substantially permanently electrically polarized photo-conductive material and being asymmetrically conductive, the said two variable-impedance elements determining the successive voltages applied to each luminescent element exhibiting opposite directions of polarization and conductivity relative to the aforementioned luminescent element.

2. An intensifier as set forth in claim 1 wherein the photoconductive elements are constituted of a mixture of finely divided photoconductive material and a glass-enamel electret material binding together the photoconductive particles.

3. An intensifier as set forth in claim 2 wherein the electret material is a lithium-containing-glass-enamel, and the photoconductive material is a cadmium chalcogenide.

4. A solid state image intensifier comprising a transparent electrode, a continuous layer of electric-field-responsive luminescent material over said electrode and forming plural elements, plural insulating ridges arranged over the luminescent layer, layers of radiation-responsive variable-impedance material on the side walls of the ridges, electrode means contacting the variable-impedance layers at regions remote from the luminescent layer forming plural radiation-responsive variable-impedance layer elements, means for applying an energizing alternating voltage to the transparent electrode and electrode means whereby the successive voltages applied to each luminescent element are alternately determined by the impedance condition of two variable-impedance layer elements on facing side walls of adjacent ridges, said variable-impedance layer elements each being constituted by substantially permanently electrically polarized photoconductive-electret material and being asymmetrically conductive, the said two variable-impedance layer elements determining the successive voltages applied to each luminescent element exhibiting opposite directions of polarization and conductivity relative to the aforementioned luminescent element but the polarization directions being the same for the layer elements on each ridge.

5. A solid state image intensifier comprising a transparent electrode, a continuous layer of electric-field-responsive luminescent material over said electrode and forming plural elements, an opaque layer over the luminescent layer, plural spaced rows of radiation-responsive variable-impedance material forming plural variable-impedance elements arranged over the opaque layer, means interconnecting the variable-impedance elements including spaced conductive islands contacting the edges of the variable-impedance elements and over the islands bodies of resistance material, spaced elongated electrodes each contacting a row of the resistance bodies and extending parallel to the rows of the variable-impedance elements, and means for applying an energizing alternating voltage to alternately interconnected elongated electrodes whereby the successive voltages applied to each luminescent element are alternately determined by the impedance condition of one of two overlying variable-impedance elements, said variable-impedance elements each being constituted by substantially permanently electrically polarized photoconductive-electret material and being asymmetrically conductive, the said two variable-impedance elements determining the successive voltages applied to each luminescent element exhibiting opposite directions of polarization and conductivity relative to the aforementioned luminescent element.

6. An intensifier as set forth in claim 5 wherein the photoconductive elements are all polarized parallel to their major surface and transverse to the longitudinal direction of the rows and in the same direction.

7. An intensifier as set forth in claim 5 wherein the photoconductive elements are all polarized parallel to their major surface and transverse to the longitudinal direction of the rows, adjacent photoconductive elements being polarized in opposite directions.

8. An intensifier as set forth in claim 5 wherein the bodies of resistance material are constituted of photoconductive material.

9. An intensifier as set forth in claim 8 wherein the photoconductive material of the resistance bodies is X-ray responsive.

References Cited in the file of this patent

UNITED STATES PATENTS

| | | |
|---|---|---|
| 2,839,690 | Kazan | June 17, 1958 |
| 2,930,999 | Van Santen et al. | Mar. 29, 1960 |